United States Patent [19]

Bruesselbach et al.

[11] Patent Number: 5,636,239
[45] Date of Patent: Jun. 3, 1997

[54] SOLID STATE OPTICALLY PUMPED LASER HEAD

[75] Inventors: Hans W. Bruesselbach, Monte Nido; Robert W. Byren, Hermosa Beach; Eric C. Fest, Venice; Steven C. Matthews, Pacific Palisades; Stephen R. Klinger, Redondo Beach, all of Calif.

[73] Assignee: Hughes Electronics, Los Angeles, Calif.

[21] Appl. No.: 441,352

[22] Filed: May 15, 1995

[51] Int. Cl.[6] .............................. H01S 3/091; H01S 3/092
[52] U.S. Cl. ........................................... 372/70; 372/35
[58] Field of Search .............................. 372/35, 70, 103

[56] References Cited

U.S. PATENT DOCUMENTS

| | | |
|---|---|---|
| 3,395,366 | 7/1968 | Snitzer. |
| 4,751,716 | 6/1988 | Ream et al. ........................ 372/35 |
| 4,756,002 | 7/1988 | Ruggieri et al. ................... 372/70 |
| 4,969,155 | 11/1990 | Kahan ............................... 372/70 |
| 5,033,058 | 7/1991 | Cabaret et al. .................... 372/70 |
| 5,307,365 | 4/1994 | Stappaerts et al. ................ 372/70 |
| 5,317,585 | 5/1994 | Gregor. |
| 5,471,491 | 11/1995 | Phillips et al. .................... 372/35 |

*Primary Examiner*—Rodney B. Bovernick
*Assistant Examiner*—Robert E. Wise
*Attorney, Agent, or Firm*—Gordon R. Lindeen, III; Wanda K. Denson-Low

[57] ABSTRACT

A laser pump cavity assembly having a laser rod with a ground outer surface positioned concentrically within an annular jet sleeve which is, in turn, positioned concentrically within an annular outer sleeve. The outer sleeve is coated with a dielectric coating having slits therein arranged to receive focused optical pump radiation from respective laser diode arrays, the pump radiation being transmitted through the outer sleeve and jet sleeve to excite the laser rod. The jet sleeve is positioned to define cooling fluid chambers between the outer sleeve and the jet sleeve, and between the jet sleeve and the laser rod, and is provided with a series of jet holes for directing cooling fluid to impinge perpendicularly on the laser rod. The end faces of the jet sleeve and outer sleeve are further coated with dielectric material to enhance the efficiency of the device. The cooperating end caps which mount the outer sleeve, jet sleeve, and laser rod employ a number of advantageous self-aligning and sealing features.

28 Claims, 5 Drawing Sheets

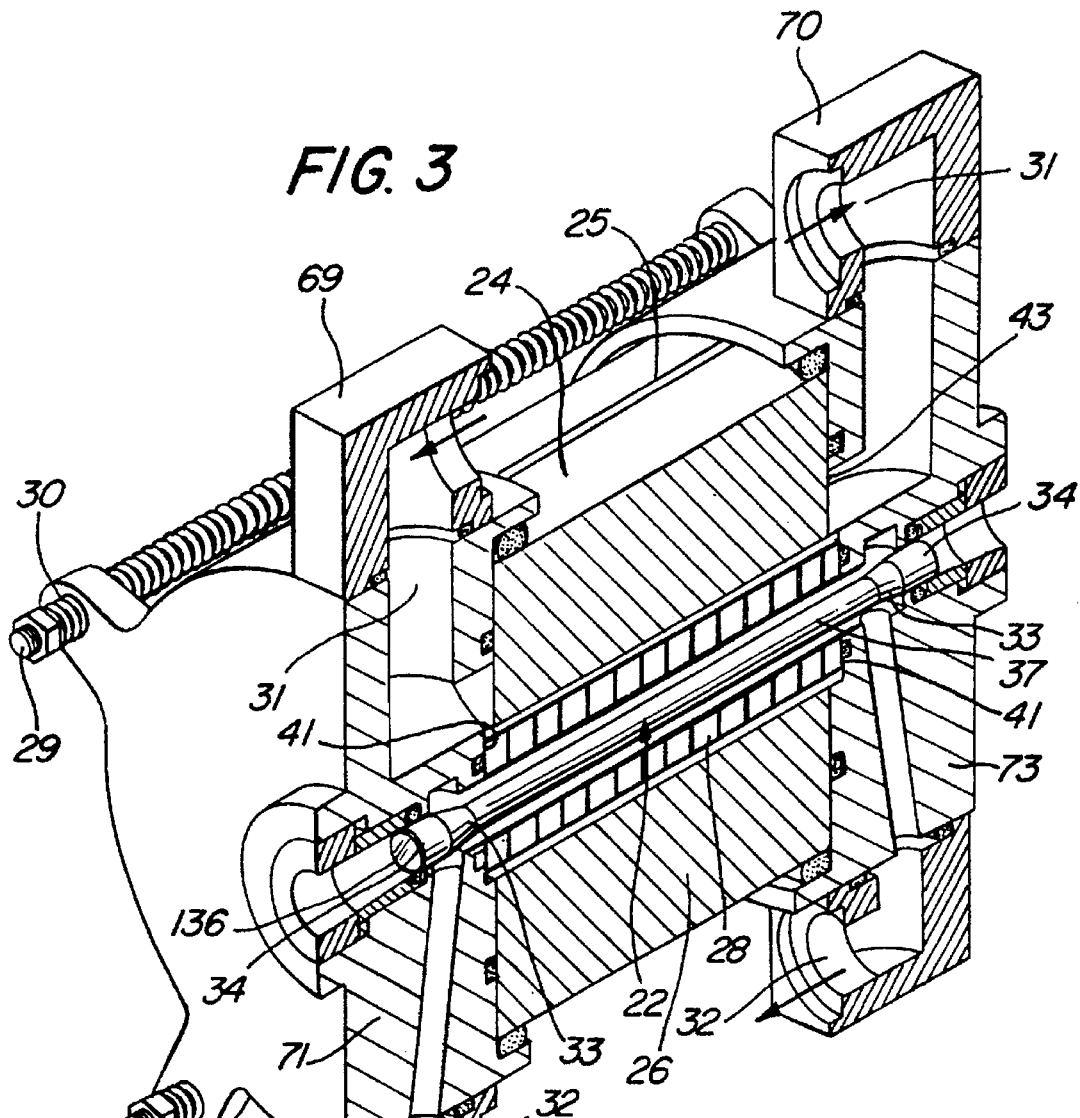
FIG. 3
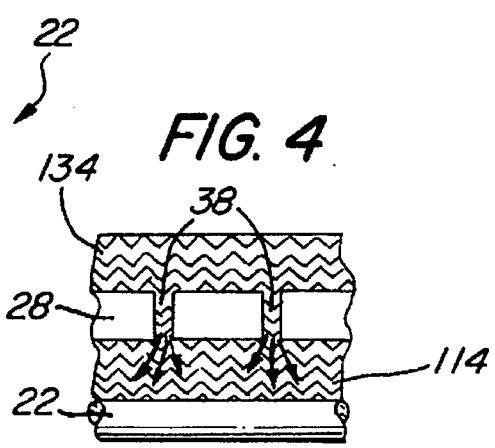
FIG. 9
FIG. 4

TRANSPORT 2%
COATINGS 2%
BK7 1%
OUTER ENDS 2%
SLITS 3%
METHANOL (OUTER) 1%
METHANOL (INNER) 1%
Yb:YAG 88%

SOLID STATE OPTICALLY PUMPED LASER HEAD

BACKGROUND OF THE INVENTION

1. Field of the Invention

The subject invention relates generally to lasers and, more particularly, to a compact, optically pumped, high power, liquid impingement cooled solid state laser head.

2. Description of Related Art

Prior known optically pumped lasers provide only one or two passes of the optical pump light through the laser crystal rod. Inefficient metallic reflecting coatings have been used on the pump cavity exterior, resulting in reduced optical coupling efficiency of the pumped radiation to the laser rod. Such lasers have further employed a costly large fused silica ellipsoidal cavity and polished laser rods, causing depumping by parasitic oscillations.

Another problem attendant to prior known optically pumped lasers is the existence of "optical caustics." This term refers to optical foci within the integrating cavity caused by reflection and refraction at the optical surfaces which may cause damage to the optical materials within the cavity.

OBJECTS AND SUMMARY OF THE INVENTION

It is therefore an object of the invention to improve lasers;

It is another object to improve optically pumped lasers;

It is another object to increase optical coupling efficiency of such lasers;

It is another object to eliminate or reduce parasitic effects in such lasers such as transverse modes or whisper modes and also to eliminate or reduce optical caustics; and It is another object to provide an improved compact, optically pumped, high power, liquid impingement cooled solid state laser head.

The present invention provides efficient and uniform optical pumping when using solid state laser diodes with a laser crystal having relatively low optical absorption. The design according to the invention encourages multiple passes of the pump light through the laser crystal. It may use a ground surface laser rod which minimizes transverse whisper modes, eliminates optical caustics in or near the laser rod, and achieves superior optical pumping uniformity. The design further employs a cylindrical optical pump cavity with high reflectivity circumferential multilayer dielectric coating. Improved heat transfer from the laser rod to its coolant is provided by the use of impingement flow for the coolant. Optical coupling efficiency of 88% may be achieved.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 3 shows a section through the cylindrical optical pump cavity of the preferred embodiment;

FIG. 4 is an enlarged view of a portion of FIG. 3;

FIG. 9 is a side view of one end of a laser rod according to the preferred embodiment.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a particularly efficient and economically fabricatable laser head.

Figure 1:
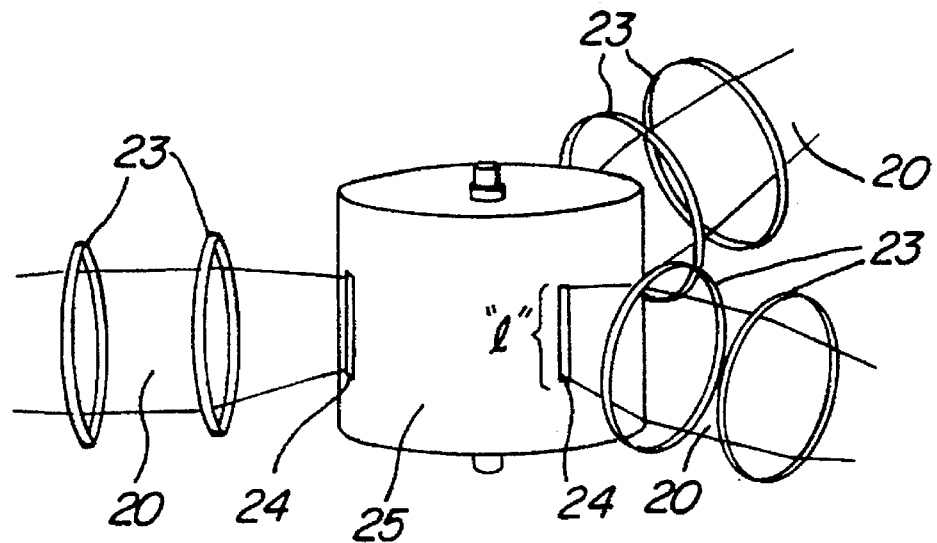
FIG. 1 shows a side perspective view of the schematic layout of an optical pumping array according to the preferred embodiment.
Figure 2:
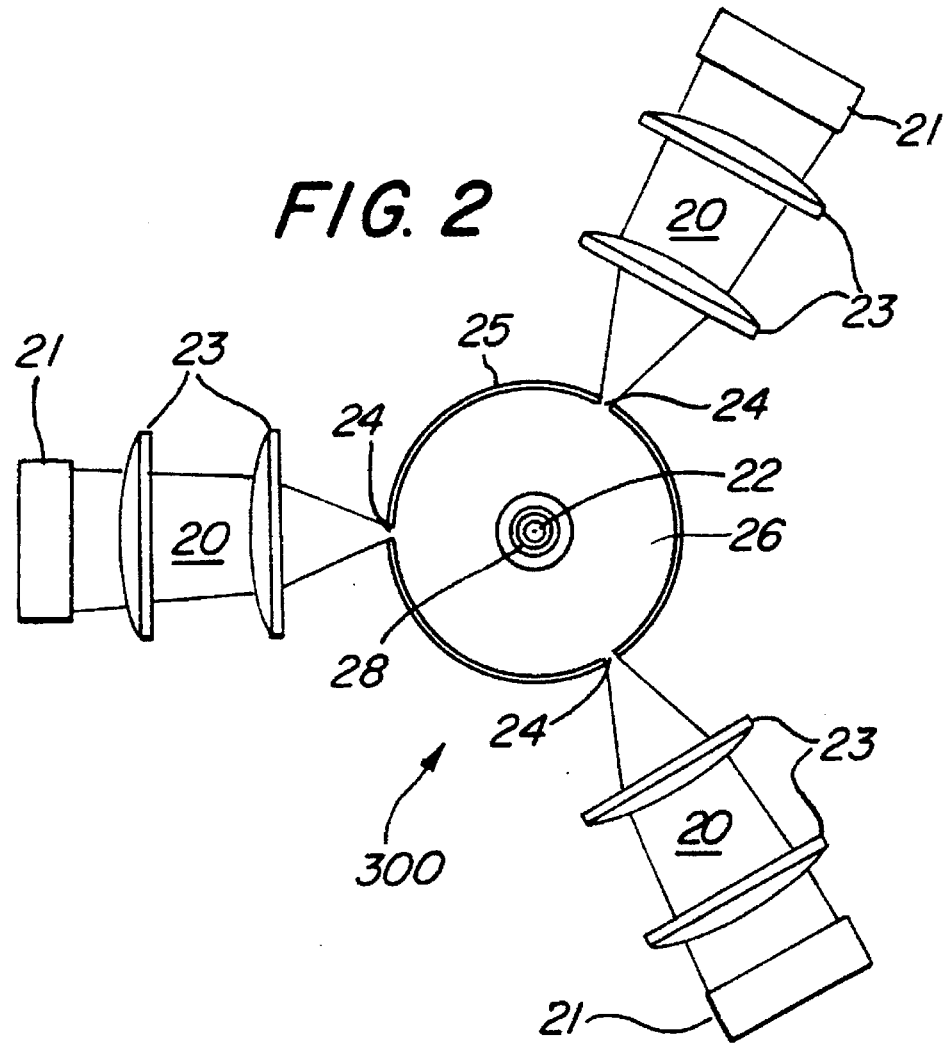
FIG. 2 shows a top view of the layout of FIG. 1.
Figure 5:
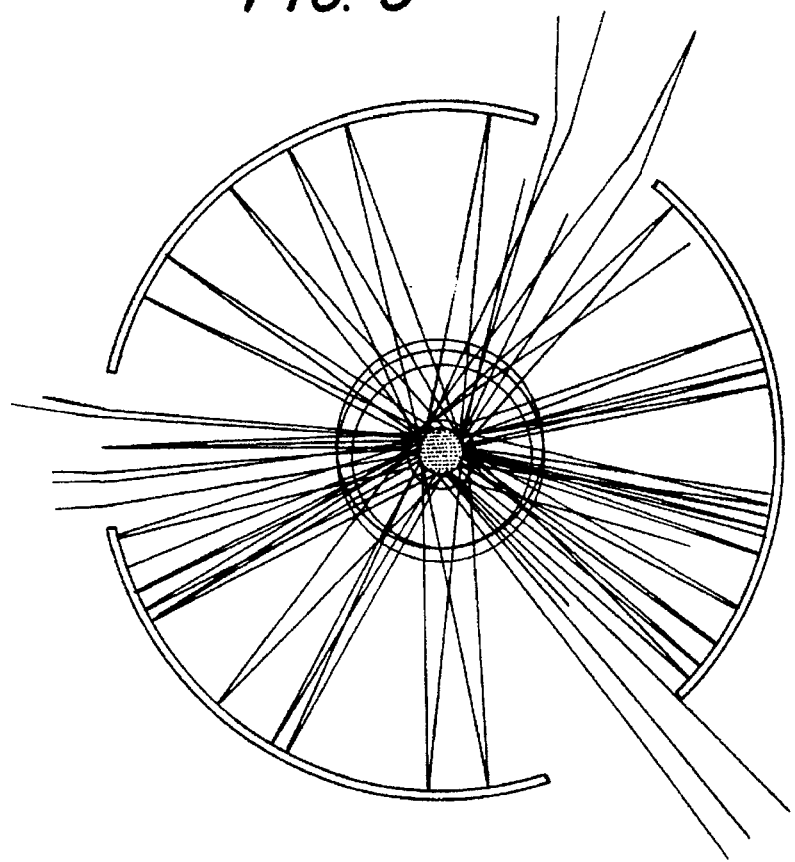
FIG. 5 is a schematic end view diagram illustrating the optical paths of the pumping radiation in a cavity according to the preferred embodiment.
Figure 6:
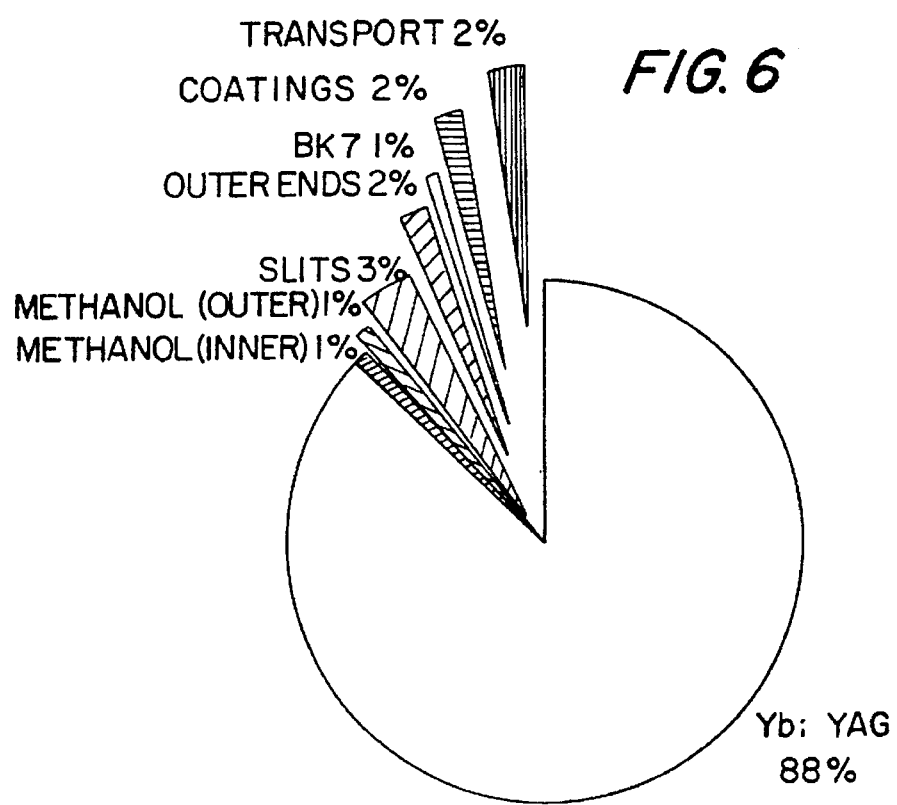
FIG. 6 is a pie chart illustrating the theoretical optical coupling efficiency of the pump radiation to the laser rod based on optical ray trace analysis.

The preferred solid state laser pump head cavity design is illustrated in FIGS. 1–4. As shown in FIGS. 1 and 2, the preferred embodiment includes three groups of solid state pump laser diodes and integral microlenses 21, three corresponding conventional lenses 23, and a cylindrical optical pump cavity assembly 300. The pump cavity assembly 300 includes a centrally-located laser crystal rod 22 having a ground surface. The pump cavity assembly 300 further includes a light transmissive jet sleeve 28 and a light transmissive outer sleeve 26. The jet sleeve 28 serves to direct liquid coolant through jet holes 38 (FIG. 4) to impinge on the laser rod 22, as hereafter described in more detail.

A circumferential, high reflectivity, dielectric coating 25 is formed on the outer sleeve 26. Three apertures 24 are located in the dielectric coating 25, each spaced 120 degrees apart from the other. High reflectivity multilayer coatings are also applied at each end face 41 of the jet sleeve 28 and at each end face 43 of the outer sleeve 26 in order to reflect diode laser energy back into the laser rod 22. Face sealing is used for both the outer sleeve 26 and the jet sleeve 28.

In overall operation, the optical pumping radiation 20 of the three groups of solid state pump laser diodes 21 is directed toward the laser crystal rod 22 by the lenses or reflectors 23 through the three apertures or slits 24 in the dichroic reflecting coating 25. Care is taken to ensure that essentially all of the pumping radiation passes through the apertures 24 and impinges on the laser rod 22.

The optical pump radiation 20 which enters one of the three transmissive slits 24 and is not absorbed by the laser rod 22 on a first pass is reflected by the dielectric reflecting coating 25 on the outer sleeve 26 and is redirected back toward the laser rod 22. This process is repeated until all of the optical pump radiation 20 is either: (1) absorbed by the laser rod 22; (2) absorbed by the liquid coolant, the jet sleeve 28, or the outer sleeve 26; (3) transmitted back out of the integrating cavity through one of the transmissive slits 24 or the dielectric reflecting coating 25; or (4) transmitted out of the integrating cavity through the end surfaces of the jet sleeve 28, the outer sleeve 26, the liquid coolant channels, or the laser rod 22.

A portion of the optical pump radiation 20 that is absorbed by the laser rod 22 pumps ions in the laser rod crystal from a ground state to an excited state, increasing the population of ions in the crystal that are in an excited state. In a crystal such as Yb:YAG, a ytterbium ion is pumped by a photon at a wavelength of 941.3 nanometers (nm) provided by the laser diodes 21 and relaxes through nonradiative means to a metastable upper laser level that is 10,624 cm$^{-1}$ above the ground state. Stimulated emission occurs between this level and a lower laser level located 612 cm$^{-1}$ above the ground state, producing laser light at a wavelength of 1029.3 nm. The ion then relaxes through nonradiative means to the ground state, and is available again to absorb another photon of pump radiation.

The dielectric coatings on the outer sleeve 26 and the ends of the outer sleeve 26 and the jet sleeve 28 are conventional multilayer thin film dielectric coatings such as $MgF_2$, $SiO_2$, ZnS, or cryolite, which can be deposited using conventional vacuum coating chambers. Excellent circumferential coatings can be applied, for example, by Thin Film Lab, 501B Basin Road, West Hurley, N.Y. 12491, using a rotisserie fixture that slowly turns the cylindrical sleeve 26 about its longitudinal axis in a coating chamber to produce coatings of uniform circumferential thickness.

Suitable specifications for the circumferential coatings are:

A. Hard dielectric coat for >99.5% reflectance at 0.9413 and <50% reflectance at 1.0293 micrometer wavelength, for 0 to 60 degrees internal angle of incidence.

B. Must exceed Scotch Tape and eraser tests (MIL-C-675A).

C. Insoluble in water and alcohol, acetone, and detergent.

D. Coating shall be capable of withstanding a flux density of 100 kW/cm$^2$.

Suitable specifications for the coatings in the three transmissive apertures (slits) 24 are:

A. Antireflection coat <0.2% reflectance at 0.942 micrometer wavelength.

B. Coating shall be capable of withstanding a flux density of 100 kW/cm$^2$.

In the preferred embodiment, the outer sleeve 26 is generally much larger than the size of the laser rod 22 such that the transmissive slits 24 represent a small portion of the surface area of the outer sleeve 26. For example, the outer sleeve 26 may be 2.5 cm in diameter, compared to a 2.0 mm diameter for the laser rod 22.

Each group of diodes 21 may employ off-the-shelf quasi-CW InGaAs laser diode arrays or "bars" as available from SDL, Inc., 80 Rose Orchard Way, San Jose, Calif. 95134-1356. The diode bars are specified to emit at a wavelength of 941.3 nm, which is the center of the absorption band for Yb:YAG. The package configuration is the SDL-3235-J5, which mounts five 1 cm bars on 2 mm centers (2 mm pitch), with integral microlens arrays (not shown), also spaced on 2 mm centers (optic axes separated by 2 mm). The package uses an impingement cooler for moderately high duty factor operation (life tested up to 30% duty factor).

Exemplary dimensions for each aperture or slit 24 are: width=2.3 mm, length ("l")=7.1 mm. The transmissive slits 24 are limited in both length and width, and these dimensions are optimized for diode beam quality. In particular, the length and width of the transmissive slits 24 are optimized such that the slits 24 are as small as possible without significantly vignetting the focused pump radiation. To this end, an optical ray trace analysis is used to determine the size of the ray bundle in the plane of the transmissive slits 24. The slit size is optimized when the overall absorption efficiency (fraction of original diode power that is eventually absorbed within the laser rod) is maximized. In a device configured according to the preferred embodiment, the size of each slit 24 was designed to pass 80% of the pump radiation. A masking error resulted in slit sizes that were larger than specified, increasing the transport efficiency into the cavity somewhat, but at the expense of a lower cavity absorption efficiency (more pump light lost through slits in subsequent passes).

With respect to overall design considerations, it may be observed that an increase in pump diode beam quality or focusability permits a decrease in the dimensions of the slits 24. The focusability of the light emitted from the pump diodes 21 is enhanced by the use of cylindrical microlenses mounted in close proximity to the emitting facet, which individually collimate the light from each diode bar in the fast direction (thin axis of diode bar). The focusability is ultimately limited by the quality of the microlenses, the constructional errors in aligning the microlenses with the diode bars 21, warpage of the diode bars, temperature sensitivity of the microlens, and the finite emitting surface of the diode array which is transformed by the lens into an angular spread. Copending U.S. patent application Ser. No. 08/368,447, filed Jan. 4, 1995, entitled "Refractive Ellipsoid Optical Surface Without Spherical Aberration," discloses a new refractive optical form that improves the focusability of the microlens output (attorney Docket No. PD-87036).

Pump diode brightness is a product of power density at the emitting surface and focusability. Brightness can either be enhanced by increasing the power density of the diodes or by better collimating the output of each diode emitting region (e.g., emitting facet of edge emitting diode bar or emitting area of surface emitting diode array). In the preferred embodiment, conventional cylindrical microlenses were used in conjunction with edge emitting diode bars 21 to enhance the focusability of the two-dimensional "rack and stack" diode arrays. Further improvements in diode brightness can be obtained by using diodes with higher output powers (e.g., 100 W peak optical power per 1 cm bar versus 60 W), by operating the diodes at higher duty factors (e.g., cooling the diode bars directly using microchannel coolers instead of mounting the bars on conductive submounts and impingement cooling the submounts), and improving the quality of the microlenses (e.g., using the teachings of the above-mentioned copending patent application). Microchannel cooling of laser diode bars, which permits reliable operation at duty factors up to 100%, has been demonstrated at Lawrence Livermore National Laboratory and elsewhere. Such arrays are not yet commercially available, but could be used. There is evidence to suggest that the long term damage susceptibility of the diode facets is related to the aluminum concentration, and the InGaAs arrays 21 used to pump Yb:YAG at 941.3 nm contain no aluminum.

The presently preferred glass for the outer sleeve 26 for a Yb:YAG laser pump cavity is the well-known BK7 type because of its low absorption at the pump wavelength of 0.941 micrometers. The jet sleeve 28 is fused silica in the preferred embodiment. The selection of optical material for the jet sleeve 28 depends on a number of criteria. The important design consideration is the ability to fabricate the jet holes 38 using either conventional drilling or laser drilling. Laser drilling was used in the preferred embodiment due to the small size of the holes 38 required for good heat transfer efficiency. It may be preferable to drill holes in fused silica rather than BK7, even though fused silica is more absorptive at the pump wavelength. The jet sleeve 28 is thinner than the outer sleeve 26, and pump light absorption in the jet sleeve 28 does not present a significant design problem according to the preferred embodiment.

Another feature of the preferred embodiment is the "dog bone" shape of the emitting laser crystal rod 22, formed by respective tapered surfaces 33, each of which leads to an undoped, larger-diameter extension 34. The diameter of the central region 37 of the laser rod 22, is for example, 0.077 to 0.081-inch, while the undoped larger diameter extensions 34 are, for example, 0.89 to 0.93-inch in diameter. The extensions 34 are ground at the ends 136 of the rod 22 to form chamfers 35 that help to prevent chipping of the rod ends during fabrication and handling. The chamfers 35 are preferably from 0.004 to 0.008-inch long at a 45-degree angle to the rod 22. These chamfers do not obscure or vignette any portion of the central volume or region 37 of the laser rod 22 which is doped with the active ion. In this way, nearly all of the energy stored in the population inversion within the central volume or region 37 is accessible for extraction by a laser beam.

The cylindrical surface of the laser crystal rod 22 in the illustrative embodiment is a ground surface as noted above. The surface in the preferred embodiment is specified to have a rough grind with 400 grit. Grinding on the chamfers 35 is optional, as it does not affect performance. The ground cylindrical outer surface of the rod 22 increases the absorption efficiency of the integrating cavity when the rod 22 and cooling liquid are not index matched. Pump light that hits the ground surface of the rod is either forward scattered or back scattered according to an angular reflectivity function. For an ideal Lambertian scattering surface, the scattered radiation is distributed in a cos θ function, where φ is the angle of the scattered ray with respect to an axis normal to the scattering surface, regardless of the angle of incidence. Rays entering the rod 22 from the pump cavity are, on the average, directed toward the central region 37 of the rod 22 where the path length through the rod is the longest and the per-pass absorption is the greatest. Rays leaving the rod 22 are, on the average, directed in a radial direction such that, upon reflection by the coated circumference of the outer sleeve 26, these rays are again returned toward the center of the rod 22. The ground rod surface therefore improves the absorption efficiency of the integrating cavity by tending to scatter rays along a radial which increases the absorption length of each pass through the rod 22. In various embodiments, the roughness of the grind may be adjusted to optimize efficiency, pump uniformity, and cooling efficiency. What is "optimum" may differ depending on rod size.

For a quasi-three-level laser medium such as $Yb^{3+}$, the rod 22 may be a diffusion bonded assembly of three laser crystals providing three adjacent material regions, while minimizing the volume of unpumped region, which represents a loss to the laser system. Diffusion bonding is preferably achieved over the entire material interface between the interfacing regions without any gaps. Diffusion bonding of Yb:YAG crystals to undoped YAG crystals can be accomplished, for example, by Onyx Optics, 6545 Sierra Lane, Dublin, Calif. 94568.

The central cylindrical region 37 of the rod 22 is doped with the active ion, such as ytterbium ($Yb^{3+}$) in YAG (Yb:YAG). The doping concentration may be 1% atomic. Undoped segments 36 near the ends of the rod 22 have the same crystal structure, such as YAG. The end faces 136 of the end regions 34 are parallel to one another to facilitate testing, and may be cut at an angle 74 of 3.6 degrees to prevent parasitic lasing or oscillations between them. They may have a 10–5 finish per MIL-O-1380. The entire apertures of the end faces 136 are coated by conventional techniques with high damage-resistant, antireflection coatings, which may conform to the following specification:

A. Reflectance shall not be greater than 0.2% per surface.
B. The coating shall conform to the requirements of MIL-C-48407 except as noted. Humidity requirements do not apply.
C. Coating shall be capable of withstanding a flux density of 100 megawatts/$cm^2$.

The optimum doping concentration of the central doped segment 37 is dependent on a number of design parameters, including the laser medium, the diameter of the laser rod 22, the absorption efficiency of the integrating pump cavity, and the pump power per unit length. As noted in the preferred embodiment of the invention, a doping concentration of 1% atomic is used for convenience. The "percent atomic" concentration is defined as the number of active $Yb^{3+}$ ions doped into the YAG crystal divided by the total number of yttrium sites in an undoped crystal of the same volume times 100%. The optimum doping concentration is thought to be somewhat less, about 0.5% atomic. The invention is not limited to such specific doping concentrations, but applies to all doping concentrations (Yb can be doped into YAG up to 100%) and to other host crystals such as LuAG (lutetium aluminum garnet) and any other active ions such as Neodymium.

The present laser cavity design is preferably used with a radial impingement cooling method and apparatus as separately disclosed in the copending invention disclosure of Phillips, Strattan, and Desai, U.S. patent application Ser. No. 08/339,616 filed Nov. 15, 1994 (attorney Docket No. PD-94149), entitled "Method and Structure for Impingement Cooling a Laser Rod"), herein incorporated by reference. An important aspect of the present invention is the use of impingement cooling in an integrating pump cavity, as well as the unique design features that enhance the pumping efficiency of this pump head configuration.

The system of impingement cooling is schematically illustrated by the cylindrical multinozzle spraying body or jet sleeve 28 and by the detail of FIG. 4. Pressurized methyl alcohol coolant enters at 31, passes through the spraying body or jet sleeve 28, and exits at 32 (FIG. 3). As noted above, in the preferred embodiment, the orifice or "jet" holes 38 in the jet sleeve 28 are drilled using laser drilling. Typical orifice dimensions are 0.006- to 0.012-inch diameter.

A coolant inlet port 31 extends through "elbow" fittings 69, 70 and end cap manifolds 71, 73, and is in communication with an annular fluid channel 134 (FIG. 4) between the inner jet sleeve 28 and the outer sleeve 26. A coolant as indicated by the arrows is introduced through each coolant inlet port 31. Coolant outlet ports 32 extend through each of the end cap manifolds 71, 73 and are connected with the channel 134.

Coolant fluid thus enters the fluid channel 134 through input ports 31 and passes through the jet holes 38 into the annular cavity 114 about the laser rod 22. The radially extending jet holes 38 allow the coolant to spray through to, and impinge on, the laser rod 22. After the coolant has impinged on the laser rod 22, it is drawn off both ends through the end manifolds to the coolant outlets 32.

It is important to note that the coolant fluid is applied to the laser rod 22 in a substantially radial direction perpendicular to the laser rod 22. Providing such radial impingement of the coolant fluid onto the laser rod 22 provides an enhanced cooling compared to the axial flow technique of the prior art. The fluid entering in a radial direction tends to have an increased turbulent flow compared to axial flow cooling. Turbulent flow provides an increased heat transfer rate compared to laminar flow. In turbulent radial impingement cooling devices according to the present invention, the boundary layer is smaller, thereby producing a smaller temperature difference between the coolant and the laser rod 22 ($\Delta t$).

Figure 7:
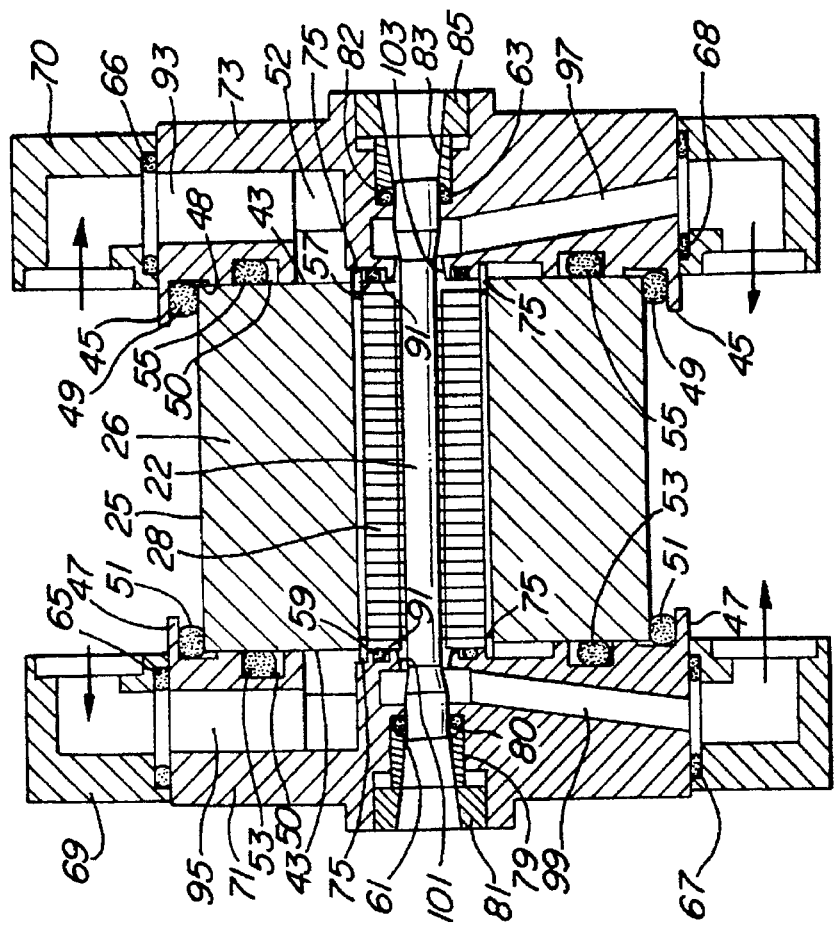
FIG. 7 is a side cross-sectional view illustrating further details of a laser assembly according to the preferred embodiment.
Figure 8:
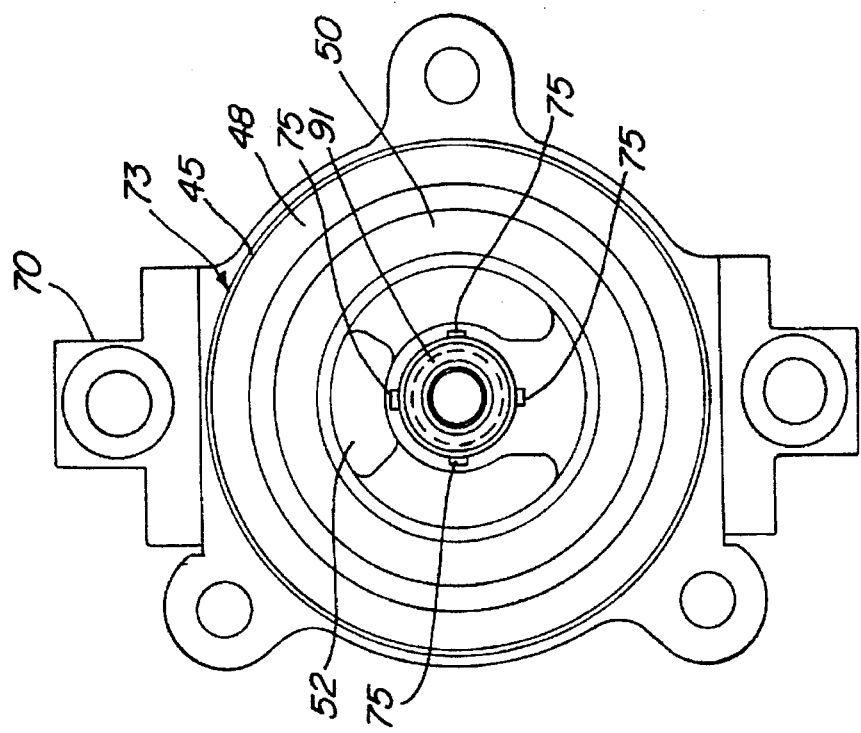
FIG. 8 is an end view of an end cap assembly with jet sleeve and outer sleeve removed.
Figure 10:
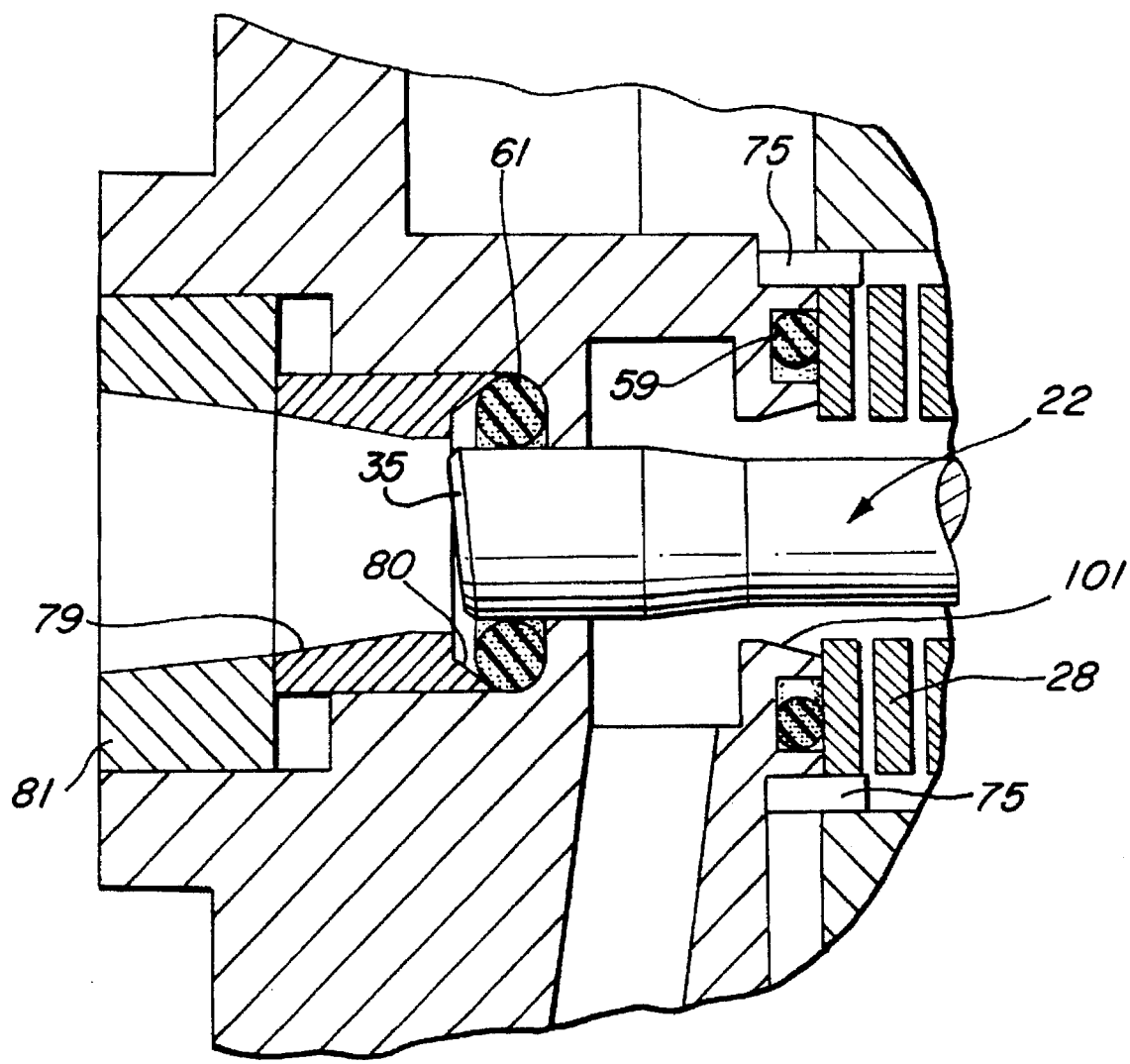
FIG. 10 is an enlarged view of a portion of FIG. 7.

FIGS. 7 and 8 illustrate further details of sealing and alignment features employed according to the preferred embodiment to enhance assembly of the laser head, maintain alignment while in use, and prevent leakage of the cooling fluid. The cylindrical outer sleeve 26 is positioned by first and second O-rings 49, 51 and four tabs 75. The O-rings 49, 51 are aligned against the inside surface of the respective end caps 73, 71 by respective collars 45, 47 integrally formed on the respective end caps 73, 71. The tabs 75 are oriented 90 degrees apart and are machined as an integral part of the respective end caps 71, 73. In addition to providing gross registration for the outer sleeve 26, the tabs 75 further locate and register the jet sleeve 28. The O-rings 49, 51 further provide a compliant, piston-type mount. Thus, the cylindrical outer sleeve 26 is slidingly inserted into the positioned O-rings 49, 51 during assembly. The whole assembly is held together by three tie rods, e.g. 29 (FIG. 3) which are under tension from springs 30. The springs 30 are used to help accommodate the differences in thermal coefficient of expansion of the components.

Additional O-ring pairs 53, 55 and 59, 57 provide face seals to prevent cooling fluid from leaking out of the laser head. The O-rings 53, 55 are located in respective annular channels 50 in each of the end caps 71, 73 and sealingly abut the end faces 43 of the outer sleeve 26. The O-rings 59, 57 are located in annular channels 91 in the respective end caps 73, 71 and sealingly about the end faces 41 of the jet sleeve 28.

The O-rings 61, 63 seal the respective cylindrical surfaces near the ends of the laser rod 22 to the end caps 71, 73. Special provision is made for sealing against the rough surface of the laser rod 22. In particular, respective plugs 79, 83 having conically tapered ends 80, 82 are slidingly inserted into the aperture such that the tapered ends 80, 82 contact the O-rings 61, 63. Respective threaded cylindrical collars 81, 85 are then screwed in to force the O-rings 61, 63 inwardly about the respective cylindrical surfaces of the laser rod 22. Thus, the O-rings 61, 63 are wedged into the laser rod 22 to improve the seal with its ground surfaces.

Finally, two pairs of O-rings 65, 67; 66, 68 are provided to seal respective fittings 69, 70 to the end caps 71, 73. The fittings 69, 70 provide an "elbow" inlet to the coolant fluid paths or ports 93, 95, 97, 99.

Reflective conical baffles 101,103 are included as part of the manifold structure. These baffles are machined and polished conical surfaces which act to capture and reflect or return a portion of the pump light that would be lost through the coolant manifolds.

Those skilled in the art will appreciate that various adaptations and modifications of the just-described preferred embodiment can be configured without departing from the scope and spirit of the invention. Thus, for example, while various specific dimensioning and other parameters have been given related to the illustrative embodiment, these may be varied by those skilled in the art in configuring other devices employing the teachings of the invention. Various features, such as a ground laser rod surface, improve performance in the illustrative embodiment where the cooling liquid is not well index matched to the laser rod. In other embodiments, it may be desirable or possible to omit such features. Therefore, it is to be understood that, within the scope of the appended claims, the invention may be practiced other than as specifically described herein.

What is claimed is:

1. A laser apparatus comprising:

a first sleeve having a cylindrical outer surface and a central cavity therein, said cavity being shaped to receive a laser medium, said cavity including a light transmissive jet Sleeve for directing cooling fluid to impinge on said laser medium;

means for mounting said first sleeve and said jet sleeve means and for conducting cooling fluid to Said jet sleeve means; and a plurality of light transmissive aperture means, each aperture means located on the circumference of said first sleeve for receiving pump light and transmitting said pump light to said central cavity.

2. The laser apparatus of claim 1 further including:

a pump light source means associated with each said aperture means for generating pump light and directing the pump light toward a respective aperture means, each said pump light source means including a laser diode array for generating said pump light; and means for focusing the pump light generated by each said laser diode array.

3. The laser apparatus of claim 2 wherein said plurality of aperture means comprises three slits equally spaced about said circumference.

4. The laser apparatus of claim 2 wherein said means for focusing includes focusing optics optimized such that extreme rays passing through the transmissive aperture means intercept the laser medium nearly tangent to its surface.

5. The laser apparatus of claim 1 wherein said laser medium comprises a laser rod having a first diameter and wherein said first sleeve is at least two times larger in outside diameter than said first diameter.

6. The laser apparatus of claim 1 wherein said slits are optimized in size to maximize overall cavity absorption efficiency.

7. The laser apparatus of claim 1 wherein the length of said slits is in the range of 2–100 millimeters.

8. The laser apparatus of claim 1 wherein said laser means comprises a quasi-three-level laser and further includes doping means in said quasi-three-level laser for minimizing pump power required to achieve a population inversion between upper and lower laser levels.

9. The laser apparatus of claim 8 wherein said doping means is a low doping concentration of 1 percent atomic or less.

10. The laser apparatus of claim 8 wherein said laser means comprises a laser rod dog bone-shaped to avoid vignetting of the active volume of the laser crystal.

11. The laser apparatus of claim 10 wherein the laser rod has respective undoped end regions bonded on either side of a doped central region, thereby avoiding absorption losses in the unpumped end regions.

12. The laser apparatus of claim 1 further including dielectric coating means on said outer surface for redirecting optical pump radiation reflected by said laser medium back toward said laser medium.

13. The laser apparatus of claim 1 wherein the laser medium comprises laser rod having a ground surface for improving absorption efficiency.

14. The laser apparatus of claim 1 wherein the cooling fluid is methyl alcohol.

15. The laser of claim 1 wherein said means for mounting includes face sealing means for preventing cooling fluid from leaking past said jet sleeve means.

16. The laser apparatus of claim 15 wherein said jet sleeve means comprises a generally annular structure having a plurality of jet holes therein, each jet hole being located on a radius of said annular structure, for directing cooling fluid to perpendicularly impinge on said laser rod and wherein said face sealing means comprises O-ring means for sealingly abutting each annular end face of said jet sleeve.

17. The laser apparatus of claim 16 wherein said housing means further includes tab means for positioning said jet sleeve means within said outer sleeve.

18. The laser apparatus of claim 17 wherein the respective inner diameter of said outer sleeve and outer diameter of said jet sleeve are selected to define a fluid flow channel between said outer sleeve and jet sleeve and wherein said tab means positions said jet sleeve concentrically with respect to said outer sleeve such that the cross-sectional shape of said fluid flow channel is annular.

19. The laser apparatus of claim 18 wherein said tab means comprises four tabs, each spaced 90 degrees apart from one another.

20. The laser apparatus of claim 1 wherein said laser medium comprises a laser rod and further including means in said mounting means for positioning said laser rod within said jet sleeve means so as to define a fluid chamber about said laser rod.

21. The laser apparatus of claim 20 wherein said means for positioning comprises:

O-ring means for conformably mounting about each end of said laser rod and for abutting an adjacent surface of said mounting means; and means for forcing said O-ring means into sealing relation with the respective ends of said laser rod and the respective adjacent surface of said mounting means.

22. The laser apparatus of claim 21 further including means in said mounting means for mounting and positioning said outer sleeve.

23. The laser apparatus of claim 20 wherein said mounting means includes a conical baffle means at each end of said jet sleeve means for reflecting pump radiation back toward said laser rod.

24. Laser apparatus comprising:

a light transmissive annular outer sleeve providing a cylindrical cavity therein and having an outer surface;

a dielectric coating on the outer surface of said outer sleeve;

a laser rod positioned in said cavity;

a light transmissive jet sleeve means located within said cavity about said laser rod and having a plurality of orifices therein for directing cooling fluid transversely into said cavity so as to impinge perpendicularly on said laser rod; and a plurality of slit means in said dielectric coating for conducting pump light through said outer sleeve and jet sleeve means to said laser rod.

25. The laser apparatus of claim 24 wherein said outer sleeve comprises glass and said jet sleeve means comprises fused silica.

26. The laser apparatus of claim 24 wherein said outer sleeve and said jet sleeve means each have a pair of end faces and further including dielectric coating means on the respective end faces of said outer sleeve and said jet sleeve means for reflecting energy back into said laser rod.

27. The laser apparatus of claim 24 wherein said laser apparatus includes means including at least one inlet port and at least one outlet port for conducting cooling fluid to said jet sleeve means and away from said laser rod and further includes seal means for preventing escape of said cooling fluid other than through said at least one outlet port.

28. The laser apparatus of claim 24 wherein said laser rod has a ground surface.

* * * * *